US012776558B2

(12) United States Patent
Murdock

(10) Patent No.: US 12,776,558 B2

(45) Date of Patent: Oct. 27, 2026

(54) MECHANICAL FASTENER ARRANGEMENTS IN SPATIAL POWER-COMBINING DEVICES AND RELATED METHODS

(71) Applicant: Qorvo US, Inc., Greensboro, NC (US)

(72) Inventor: Dylan Murdock, Bend, OR (US)

(73) Assignee: Qorvo US, Inc., Greensboro, NC (US)

( * ) Notice: Subject to any disclaimer, the term of this patent is extended or adjusted under 35 U.S.C. 154(b) by 41 days.

(21) Appl. No.: 19/073,719

(22) Filed: Mar. 7, 2025

(65) Prior Publication Data

US 2025/0329909 A1 Oct. 23, 2025

Related U.S. Application Data

(60) Provisional application No. 63/637,440, filed on Apr. 23, 2024.

(51) Int. Cl.
*H01P 3/06* (2006.01)
*H01P 5/12* (2006.01)

(52) U.S. Cl.
CPC . *H01P 3/06* (2013.01); *H01P 5/12* (2013.01)

(58) Field of Classification Search
CPC ............... H01P 5/12; H01P 5/183; H01P 3/06
See application file for complete search history.

(56) References Cited

U.S. PATENT DOCUMENTS

| | | | |
|---|---|---|---|
| 3,023,382 | A | 2/1962 | Borghetti |
| 4,234,854 | A | 11/1980 | Schellenberg et al. |
| 4,424,496 | A | 1/1984 | Nichols et al. |

(Continued)

FOREIGN PATENT DOCUMENTS

| | | | |
|---|---|---|---|
| EP | 2469996 | A2 | 6/2012 |
| EP | 3279597 | A1 | 2/2018 |

(Continued)

OTHER PUBLICATIONS

Amjadi, S., et al., "Design of a Broadband Eight-Way Coaxial Wavelength Power Combiner," IEEE Transactions on Microwave Theory and Techniques, vol. 60, Issue 1, Nov. 15, 2011, pp. 39-45.

(Continued)

*Primary Examiner* — Andrea Lindgren Baltzell
*Assistant Examiner* — Alan Wong
(74) *Attorney, Agent, or Firm* — Withrow & Terranova, P.L.L.C.

(57) ABSTRACT

Power-combining devices and, more particularly, mechanical fastener arrangements in spatial power-combining devices and related methods are disclosed. Mechanical fastener arrangements promote mechanical connections between center waveguide sections and input and/or output coaxial waveguide sections that provide scalable structures for different operating frequency bands, improved mechanical connections, and/or improved assembly. Exemplary mechanical fastener arrangements attach conductors of input and/or output coaxial waveguide sections to center waveguide sections with mechanical fasteners. Heads of mechanical fasteners are positioned within center waveguide sections and nuts secured to the mechanical fasteners are in positions that are outside center waveguide sections.

20 Claims, 7 Drawing Sheets

(56) References Cited

U.S. PATENT DOCUMENTS

| | | | | |
|---|---|---|---|---|
| 4,429,286 | A * | 1/1984 | Nichols | H03F 3/58 330/56 |
| 4,612,512 | A | 9/1986 | Powell et al. | |
| 4,724,400 | A | 2/1988 | Luettgenau | |
| 5,036,335 | A | 7/1991 | Jairam | |
| 5,142,253 | A * | 8/1992 | Mallavarpu | H01P 5/12 333/127 |
| 5,162,803 | A | 11/1992 | Chen | |
| 5,214,394 | A | 5/1993 | Wong | |
| 5,256,988 | A | 10/1993 | Izadian | |
| 5,736,908 | A | 4/1998 | Alexanian et al. | |
| 5,920,240 | A | 7/1999 | Alexanian et al. | |
| 6,028,483 | A | 2/2000 | Shealy et al. | |
| 6,037,840 | A | 3/2000 | Myer | |
| 6,181,221 | B1 | 1/2001 | Kich et al. | |
| 6,828,875 | B2 | 12/2004 | Channabasappa et al. | |
| 7,110,165 | B2 | 9/2006 | Martin et al. | |
| 7,215,220 | B1 * | 5/2007 | Jia | H01P 5/12 333/136 |
| 7,466,203 | B2 | 12/2008 | Rector | |
| 8,558,620 | B2 | 10/2013 | Fraysse et al. | |
| 8,698,577 | B2 | 4/2014 | Sherrer et al. | |
| 8,801,922 | B2 | 8/2014 | Wrazel et al. | |
| 8,928,429 | B2 | 1/2015 | Song et al. | |
| 9,019,036 | B2 | 4/2015 | Kolias et al. | |
| 9,054,427 | B2 | 6/2015 | Guy et al. | |
| 9,065,163 | B1 | 6/2015 | Wu et al. | |
| 9,276,304 | B2 | 3/2016 | Behan et al. | |
| 9,287,605 | B2 | 3/2016 | Daughenbaugh, Jr. et al. | |
| 9,293,801 | B2 | 3/2016 | Courtney et al. | |
| 9,325,074 | B2 | 4/2016 | Chandler | |
| 9,547,344 | B2 | 1/2017 | Han | |
| 9,917,343 | B2 | 3/2018 | Chieh et al. | |
| 9,954,706 | B1 | 4/2018 | Harris et al. | |
| 10,003,118 | B2 | 6/2018 | Kitt | |
| 10,009,067 | B2 | 6/2018 | Birk et al. | |
| 10,164,667 | B1 | 12/2018 | Kitt | |
| 10,263,651 | B1 | 4/2019 | Kitt | |
| 10,340,574 | B2 | 7/2019 | Mohan et al. | |
| 10,454,433 | B2 | 10/2019 | Kitt | |
| 10,651,527 | B2 | 5/2020 | Mohan | |
| 10,707,819 | B2 | 7/2020 | Yoon et al. | |
| 10,720,711 | B2 * | 7/2020 | Mohan | H01P 5/103 |
| 11,621,469 | B2 * | 4/2023 | Kitt | H01Q 23/00 455/129 |
| 11,955,687 | B2 * | 4/2024 | Murdock | H01P 5/12 |
| 12,525,696 | B2 * | 1/2026 | Murdock | H01P 5/12 |
| 2002/0118520 | A1 | 8/2002 | Baker | |
| 2004/0108903 | A1 | 6/2004 | Channabasappa et al. | |
| 2006/0202777 | A1 | 9/2006 | Deckman et al. | |
| 2007/0229186 | A1 | 10/2007 | Hacker et al. | |
| 2007/0279146 | A1 | 12/2007 | Rector | |
| 2010/0065256 | A1 | 3/2010 | Wilcoxon et al. | |
| 2011/0006858 | A1 | 1/2011 | Fraysse | |
| 2011/0300230 | A1 | 12/2011 | Peterson et al. | |
| 2013/0003309 | A1 | 1/2013 | Stella | |
| 2013/0127678 | A1 | 5/2013 | Chandler | |
| 2014/0145794 | A1 | 5/2014 | Courtney et al. | |
| 2014/0145795 | A1 | 5/2014 | Behan et al. | |
| 2014/0167880 | A1 | 6/2014 | Daughenbaugh, Jr. et al. | |
| 2014/0347145 | A1 | 11/2014 | Nakamura et al. | |
| 2015/0002238 | A1 | 1/2015 | Ryu et al. | |
| 2015/0270817 | A1 | 9/2015 | Campbell | |
| 2017/0077577 | A1 | 3/2017 | Crouch | |
| 2017/0149113 | A1 | 5/2017 | Theveneau et al. | |
| 2017/0179598 | A1 | 6/2017 | Kitt | |
| 2018/0187984 | A1 | 7/2018 | Manzo | |
| 2018/0294539 | A1 | 10/2018 | Kitt | |
| 2019/0007007 | A1 | 1/2019 | Kitt | |
| 2019/0067778 | A1 | 2/2019 | Mohan | |
| 2019/0067781 | A1 | 2/2019 | Mohan et al. | |
| 2019/0067782 | A1 | 2/2019 | Mohan et al. | |
| 2019/0067783 | A1 | 2/2019 | Mohan et al. | |
| 2019/0067836 | A1 | 2/2019 | Mohan | |
| 2019/0068123 | A1 | 2/2019 | Mohan et al. | |
| 2019/0068140 | A1 | 2/2019 | Mohan et al. | |
| 2019/0068141 | A1 | 2/2019 | Yoon et al. | |
| 2019/0081453 | A1 | 3/2019 | Meehan et al. | |
| 2019/0140356 | A1 | 5/2019 | Mohan | |
| 2019/0293099 | A1 | 9/2019 | Pitt | |
| 2019/0312327 | A1 | 10/2019 | Kitt | |
| 2020/0041209 | A1 | 2/2020 | Valenti et al. | |
| 2020/0041210 | A1 | 2/2020 | Valenti et al. | |
| 2020/0162046 | A1 | 5/2020 | Bojkov et al. | |
| 2020/0185803 | A1 | 6/2020 | Mohan et al. | |
| 2020/0274506 | A1 | 8/2020 | Yoon et al. | |
| 2021/0297048 | A1 | 9/2021 | Yoon et al. | |
| 2021/0298207 | A1 | 9/2021 | Murdock | |
| 2022/0247061 | A1 | 8/2022 | Kitt et al. | |
| 2023/0223673 | A1 | 7/2023 | Murdock et al. | |
| 2023/0291087 | A1 | 9/2023 | Kitt | |

FOREIGN PATENT DOCUMENTS

| | | | |
|---|---|---|---|
| EP | 3454370 | A1 | 3/2019 |
| FR | 3040242 | A1 | 2/2017 |
| WO | 2017214357 | A2 | 12/2017 |
| WO | 2018134495 | A1 | 7/2018 |

OTHER PUBLICATIONS

Author Unknown, "Interpack 2005: An assessment for PMMI members," 2005, PMMI, 32 pages.

Author Unknown, "Spatial Combining Technology: Revolutionizing the Microwave Power Amplifier," Microwave Journal, Sep. 8, 2008, http://www.microwavejournal.com/articles/print/6838-spatial-combining, CAP Wireless Inc., 7 pages.

Author Unknown, "Vivaldi antenna," Wikipedia, web page last edited Feb. 7, 2017, accessed May 11, 2017, https://en.wikipedia.org/wiki/Vivaldi_antenna, Wikimedia Foundation, Inc., 2 pages.

Beyers, R., et al., "Compact Conical-Line Power Combiner Design Using Circuit Models," IEEE Transactions on Microwave Theory and Techniques, vol. 62, Issue 11, Oct. 9, 2014, pp. 2650-2658.

Caturla, F., et al., "Electroless Plating of Graphite with Copper and Nickel," Journal of the Electrochemical Soceity, vol. 142, Issue 12, Dec. 1995, The Electrochemical Society, Inc., pp. 4084-4090.

Courtney, Patrick G et al., "120 W Ka Band Power Amplifier Utilizing GaN MMICs and Coaxial Waveguide Spatial Power Combining," White Paper, May 2016, Qorvo, pp. 1-8.

Espera Jr., A.H. et al., "3D-printing and advanced manufacturing for electronics," Progress in Additive Manufacturing, Feb. 4, 2019, Springer, 24 pages.

Fathy, A., et al., "A Simplified Approach for Radial Power Combiners," IEEE Transactions on Microwave Theory and Techniques, vol. 54, No. 1, Jan. 2006, pp. 247-255.

Fitzhugh, William, et al., "Modulation of Ionic Current Limitations by Doping Graphite Anodes," Journal of Electrochemical Society, vol. 165, Issue 10, Jul. 2018, The Electrochemical Society, 6 pages.

Gharehkand, F., "Design of a 16 Way Radial Microwave Power Divider/Combiner with Rectangular Waveguide Output and Coaxial Inputs, " International Journal of Electronics and Communications (AEU), vol. 68, 2014, pp. 422-428.

Jia, Pengcheng et al., "Broadband High Power Amplifier using Spatial Power Combining Technique" IEEE Transactions on Microwave Theory and Techniques, vol. 51, Issue 12, Dec. 2003, IEEE, 4 pages.

Larkins, Grover, et al., "Evidence of Superconductivity in Doped Graphite and Graphene," Superconductor Science and Technology, vol. 29, Issue 1, Dec. 2015, IOP Publishing Ltd, 18 pages.

Leggieri, Alberto et al., "The Squarax Spatial Power Combiner," Progress in Electromagnetics Research C, vol. 45, Oct. 2013, EMW Publishing, pp. 43-55.

Montgomery, R., et al., "Solid-State PAs Battle TWTAs for ECM Systems," Microwave Journal, Jun. 2017 Supplement, Jun. 14, 2017, 3 pages.

Möttönen, V. S., "Receiver Front-End Circuits and Components for Millimetre and Submillimetre Wavelengths," Dissertation for the degree of Doctor of Science in Technology, Helsinki University of

(56) References Cited

OTHER PUBLICATIONS

Technology, Department of Electrical and Communications Engineering, Radio Laboratory, Apr. 2005, 40 pages.
Glasschroeder, J. et al., "Powder-bed-based 3D-printing of function integrated parts," Rapid Prototyping Journal, vol. 21, Issue 2, Mar. 2015, Emerald Group Publishing Limited, pp. 207-215.
Glenis, S., et al., "Sulfur doped graphite prepared via arc discharge of carbon rods in the presence of thiopenes," Journal of Applied Physics, vol. 86, Issue 8, Oct. 1999, American Institute of Physics, pp. 4464-4466.
Leigh, S.J. et al., "A Simple, Low-Cost Conductive Composite Material for 3D Printing of Electronic Sensors," PLoS ONE, vol. 7, Issue 11, Nov. 2012, 6 pages.
Ortiz, Sean C., "High Power Spatial Combiners: Tile and Tray Approaches," Dissertation, North Carolina State University, Electrical Engineering, Nov. 2001, 194 pages.
Sames, W.J. et al., "The Metallurgy and Processing Science of Metal Additive Manufacturing," 2016, available at https://www.osti.gov/servlets/purl/1267051, 76 pages.
Scheike, T., et al., "Can doping graphite trigger room temperature superconductivity: Evidence for granular high-temperature superconductivity in water-treated graphite powder," Advanced Materials, vol. 24, Issue 43, Sep. 2012, 19 pages.
Smalc, Martin, et al., "Thermal Performance of Natural Graphite Heat Spreaders," Proceedings of IPACK2005, Jul. 17-22, San Francisco, California, American Society of Mechanical Engineers, 11 pages.
Tribak, A., et al., "Ultra-Broadband High Efficiency Mode Converter," Progress in Electromagnetics Research C, vol. 36, 2013, pp. 145-158.
Saito, et al., "Compact X-Band Synthetic Aperture Radar for 100kg Class Satellite," IEICE Transactions on Communications, vol. E100-B, Issue 9, Sep. 2017, 8 pages.

* cited by examiner

MECHANICAL FASTENER ARRANGEMENTS IN SPATIAL POWER-COMBINING DEVICES AND RELATED METHODS

This application claims the benefit of U.S. provisional patent application Ser. No. 63/637,440, filed Apr. 23, 2024, the disclosure of which is incorporated herein by reference in its entirety.

FIELD OF THE DISCLOSURE

The disclosure relates generally to power-combining devices and, more particularly, to mechanical fastener arrangements in spatial power-combining devices and related methods.

BACKGROUND

Solid state power amplifiers (SSPAs) are used for broadband radio frequency power amplification in commercial and defense communications, radar, electronic warfare, satellite, and various other communication systems. As modern SSPA applications continue to advance, increasingly higher and higher saturated output power is desired. While millimeter wave (mmWave) gallium nitride (GaN) monolithic microwave integrated circuits (MMICs) have made great strides for use in SSPAs, there are many applications where even higher power densities may be out of reach for a single device. Spatial power-combining devices have been developed that provide a means to combine the output of several separate MMICs to realize a SSPA with much larger output power than that of a single device. Spatial power-combining techniques are implemented by combining broadband signals from a number of amplifiers to provide output powers with high efficiencies and operating frequencies.

One example of a spatial power-combining device utilizes a plurality of solid-state amplifier assemblies that forms a coaxial waveguide to amplify an electromagnetic signal. Each amplifier assembly may include an input antenna structure, an amplifier, and an output antenna structure. When the amplifier assemblies are combined to form the coaxial waveguide, the input antenna structures may form an input antipodal antenna array, and the output antenna structures may form an output antipodal antenna array. In operation, an electromagnetic signal is passed through an input port to an input coaxial waveguide section of the spatial power-combining device. The input coaxial waveguide section distributes the electromagnetic signal to be split across the input antipodal antenna array. The amplifiers receive the split signals and in turn transmit amplified split signals across the output antipodal antenna array. The output antipodal antenna array and an output coaxial waveguide section combine the amplified split signals to form an amplified electromagnetic signal that is passed to an output port of the spatial power-combining device.

Antenna structures for spatial power-combining devices typically include an antenna signal conductor and an antenna ground conductor deposited on opposite sides of a substrate, such as a printed circuit board. The size of the antenna structures is related to an operating frequency of the spatial power-combining device. For example, the size of the input antenna structure is related to the frequency of energy that can be efficiently received, and the size of the output antenna structure is related to the frequency of energy that can be efficiently transmitted. Overall sizes of spatial power-combining devices typically scale larger or smaller depending on desired operating frequency ranges.

The art continues to seek improved spatial power-combining devices having improved performance characteristics while being capable of overcoming challenges associated with conventional devices.

SUMMARY

The disclosure relates generally to power-combining devices and, more particularly, to mechanical fastener arrangements in spatial power-combining devices and related methods. Mechanical fastener arrangements promote mechanical connections between center waveguide sections and input and/or output coaxial waveguide sections that provide scalable structures for different operating frequency bands, improved mechanical connections, and/or improved assembly. Exemplary mechanical fastener arrangements attach conductors of input and/or output coaxial waveguide sections to center waveguide sections with mechanical fasteners. Heads of mechanical fasteners are positioned within center waveguide sections and nuts secured to the mechanical fasteners are in positions that are outside center waveguide sections.

In one aspect, a spatial power-combining device comprises: a center waveguide section comprising a plurality of amplifier assemblies, wherein the plurality of amplifier assemblies forms a first end and a second end; a first coaxial waveguide section attached to the first end; and a first mechanical fastener at least partially arranged within the center waveguide section such that the plurality of amplifier assemblies is arranged radially around the first mechanical fastener, wherein a head of the first mechanical fastener is positioned within the center waveguide section. In certain embodiments, the first coaxial waveguide section comprises a first outer conductor and a first inner conductor that form a first channel therebetween, and a threaded portion of the first mechanical fastener extends through a portion of the first inner conductor. The spatial power-combining device may further comprise a first nut in the first coaxial waveguide section, wherein the threaded portion of the first mechanical fastener is secured to the first nut. In certain embodiments: the first inner conductor comprises a first portion and a second portion that is attached to the first portion; and the first nut is positioned between the first portion of the first inner conductor and the second portion of the first inner conductor. The spatial power-combining device may further comprise a washer between the first nut and the first portion of the first inner conductor. In certain embodiments, the head of the first mechanical fastener forms a round shape, and the threaded portion of the first mechanical fastener forms another round shape. In certain embodiments, the threaded portion of the first mechanical fastener forms a shape with opposing flat surfaces.

In certain embodiments: each amplifier assembly of the plurality of amplifier assemblies forms a first slot within the center waveguide section; the first slot of each amplifier assembly of the plurality of amplifier assemblies forms a radial cavity; and the head of the first mechanical fastener is positioned within the radial cavity. The spatial power-combining device may further comprise: a second coaxial waveguide section attached to the second end; and a second mechanical fastener at least partially arranged within the center waveguide section such that the plurality of amplifier assemblies is arranged radially around the second mechanical fastener, wherein a head of the second mechanical fastener is positioned within the center waveguide section.

In certain embodiments, the second coaxial waveguide section comprises a second outer conductor and a second inner conductor that form a second channel therebetween, and a threaded portion of the second mechanical fastener extends through a portion of the second inner conductor. The spatial power-combining device may further comprise a second nut in the second coaxial waveguide section, wherein the threaded portion of the second mechanical fastener is secured to the second nut. In certain embodiments: the second inner conductor comprises a first portion that is attached to a second portion; and the second nut is positioned between the first portion of the second inner conductor and the second portion of the second inner conductor.

In another aspect, a method comprises: radially arranging a plurality of amplifier assemblies to form a center waveguide section having a first end and a second end, the plurality of amplifier assemblies forming a radial cavity that houses a head of a first mechanical fastener; attaching a first portion of a first inner conductor to the center waveguide section such that a threaded portion of the first mechanical fastener extends through the first portion of the first inner conductor; and tightening a first nut to the first mechanical fastener such that the first portion of the first inner conductor is between the center waveguide section and the first nut. The method may further comprise attaching a second portion of the first inner conductor to the first portion of the first inner conductor, such that the first nut is between the first portion of the first inner conductor and the second portion of the first inner conductor. The method may further comprise attaching a first outer conductor to the first end such that a first channel is formed between the first inner conductor and the first outer conductor, wherein the first inner conductor and the first outer conductor form a first coaxial waveguide that is attached to the center waveguide section. In certain embodiments, the first outer conductor is attached to each amplifier assembly of the plurality of amplifier assemblies by a plurality of additional mechanical fasteners.

In another aspect, a system for transmitting radio frequency energy comprises: one or more spatial power-combining devices, wherein at least one of the one or more spatial power-combining devices comprises: a center waveguide section comprising a plurality of amplifier assemblies, wherein the plurality of amplifier assemblies forms a first end and a second end; a first coaxial waveguide section attached to the first end; and a first mechanical fastener at least partially arranged within the center waveguide section such that the plurality of amplifier assemblies is arranged radially around the first mechanical fastener, wherein a head of the first mechanical fastener is positioned within the center waveguide section. In certain embodiments, the first coaxial waveguide section comprises a first outer conductor and a first inner conductor that form a first channel therebetween, and a threaded portion of the first mechanical fastener extends through a portion of the first inner conductor. The system may further comprise a first nut in the first coaxial waveguide section, wherein the threaded portion of the first mechanical fastener is secured to the first nut, wherein the first inner conductor comprises a first portion and a second portion that is attached to the first portion, and the first nut is positioned between the first portion of the first inner conductor and the second portion of the first inner conductor. In certain embodiments, the system comprises a satellite communications system.

In another aspect, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1A:
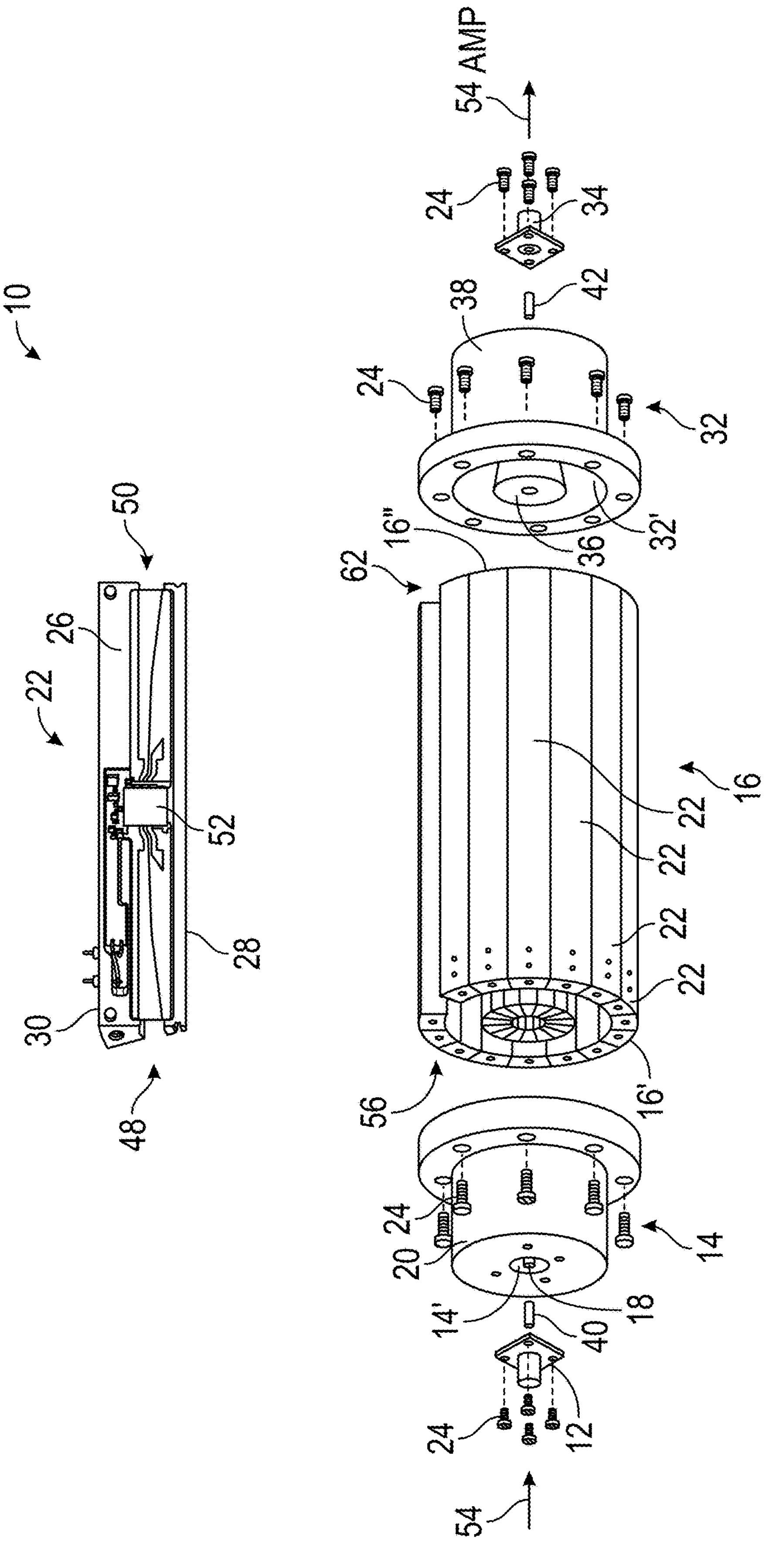
FIG. 1A is a partially-exploded perspective view of an exemplary spatial power-combining device according to principles of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

The disclosure relates generally to power-combining devices and, more particularly, to mechanical fastener arrangements in spatial power-combining devices and related methods. Mechanical fastener arrangements promote mechanical connections between center waveguide sections and input and/or output coaxial waveguide sections that provide scalable structures for different operating frequency bands, improved mechanical connections, and/or improved assembly. Exemplary mechanical fastener arrangements attach conductors of input and/or output coaxial waveguide sections to center waveguide sections with mechanical fasteners. Heads of mechanical fasteners are positioned within center waveguide sections and nuts secured to the mechanical fasteners are in positions that are outside center waveguide sections.

Aspects of the present disclosure are particularly adapted to spatial power-combining devices that operate at various radio frequencies (RF) including microwave frequencies, such as, by way of a non-limiting example, energy between about 300 megahertz (MHz) (100 centimeters (cm) wavelength) and 300 gigahertz (GHz) (0.1 cm wavelength). Additionally, embodiments may comprise operating frequency ranges that extend above microwave frequencies. In some embodiments, by way of non-limiting examples, the operating frequency range includes an operating bandwidth of 4 GHz to 40 GHz, or 2 GHz to 18 GHz, or 2 GHz to 20 GHz, or 25 to 40 GHz, among others. Accordingly, aspects of the present disclosure are related to spatial power-combining devices and related systems that transmit RF energy, including but not limited to commercial and defense communication systems, radar systems, electronic warfare systems, satellite communication systems, and various other communication systems.

A spatial power-combining device typically includes a plurality of amplifier assemblies, and each amplifier assembly typically comprises an individual signal path that includes an amplifier connected to an input antenna structure and an output antenna structure. An input coaxial waveguide is configured to provide a signal concurrently to each input antenna structure, and an output coaxial waveguide is configured to concurrently combine amplified signals from each output antenna structure. The plurality of amplifier assemblies are typically arranged coaxially about a center axis. Accordingly, the spatial power-combining device is configured to split, amplify, and combine an electromagnetic signal.

In the following figures, the terms "input" and "output" are generally used to refer to various portions of spatial power-combining devices, where the term "input" is used to describe elements that reside along portions of spatial power-combining devices where signals may propagate before amplification and the term "output" is used to describe elements that reside along portions of spatial power-combining devices where signals may propagate after amplification. In various embodiments as described herein, portions of spatial power-combing devices may exhibit some levels of symmetry between "input" portions and "output" portions. In this regard, descriptions relative to "input" elements may also be applicable to corresponding "output" elements and vice versa. Accordingly, the terms "input" and "output" as used herein may also be replaced with the terms "first" and "second" without deviating from the principles disclosed.

FIG. 1A is a partially-exploded perspective view of an exemplary spatial power-combining device 10. The spatial power-combining device 10 may comprise an input port 12 and an input coaxial waveguide section 14. The input coaxial waveguide section 14 provides a broadband transition from the input port 12 to a center waveguide section 16. Electrically, the input coaxial waveguide section 14 provides broadband impedance matching from an impedance of the input port 12 to an impedance of the center waveguide section 16. The input coaxial waveguide section 14 may include an input inner conductor 18 and an input outer conductor 20 that radially surrounds the inner conductor 18, thereby forming an opening or channel 14' therebetween. Outer surfaces of the input inner conductor 18 and an inner surface of the input outer conductor 20 may have gradually changed profiles configured to minimize the impedance mismatch from the input port 12 to the center waveguide section 16.

The center waveguide section 16 comprises a plurality of amplifier assemblies 22 arranged radially around a center axis of the spatial power-combining device 10. As illustrated, the plurality of amplifier assemblies 22 form a first end 16', or input end, of the center waveguide section 16 and an opposing second end 16", or output end, of the center waveguide section 16. The input coaxial waveguide section 14, and in particular, the input outer conductor 20 may be attached to the first end 16' by way of bolts 24 or screws, or the like that engage with corresponding portions of the amplifier assemblies 22. Each amplifier assembly 22 may include a body structure 26 having a predetermined wedge-shaped cross-section, an inner surface 28, and an arcuate outer surface 30. When the amplifier assemblies 22 are collectively assembled radially about the center axis, they form the center waveguide section 16 with a generally cylindrical shape; however, other shapes are possible, such as rectangular, oval, or other geometric shapes.

The spatial power-combining device 10 may also comprise an output coaxial waveguide section 32 and an output port 34. The input port 12 and the output port 34 may comprise any of a field-replaceable Subminiature A (SMA) connector, a super SMA connector, a type N connector, a type K connector, a WR28 connector, other coaxial to waveguide transition connectors, or any other suitable coaxial or waveguide connectors. The input port 12 and the output port 34 may be mechanically coupled respectively to the input coaxial waveguide section 14 and the output coaxial waveguide section 32. In embodiments where the operating frequency range includes a frequency of at least 18 GHz, the output port 34 may comprise a waveguide output port, such as a WR28 or other sized waveguide.

The output coaxial waveguide section 32 provides a broadband transition from the center waveguide section 16 to the output port 34. Electrically, the output coaxial waveguide section 32 provides broadband impedance matching from the impedance of the center waveguide section 16 to an impedance of the output port 34. The output coaxial waveguide section 32 includes an output inner conductor 36 and an output outer conductor 38 that radially surrounds the output inner conductor 36, thereby forming an opening or channel 32' therebetween. Outer surfaces of the output inner conductor 36 and an inner surface of the output outer conductor 38 may have gradually changed profiles configured to minimize the impedance mismatch from the output port 34 to the center waveguide section 16. In certain embodiments, a pin 40 connects between the input port 12 and the input coaxial waveguide section 14, and a pin 42 connects between the output port 34 and the output coaxial waveguide section 32. The output coaxial waveguide section 32, and in particular, the output outer conductor 38 may be attached to the second end 16" by way of outer bolts 24, or screws, or the like that engage with corresponding portions of the amplifier assemblies 22.

Each amplifier assembly 22 comprises an input antenna structure 48 and an output antenna structure 50, both of which are coupled to an amplifier 52. In certain embodiments, the amplifier 52 comprises a monolithic microwave integrated circuit (MMIC) amplifier. In further embodiments, the MMIC may be a solid-state gallium nitride (GaN)-based MMIC. A GaN MMIC device provides high power density and bandwidth, and a spatial power-combining device may combine power from a plurality of GaN MMICs efficiently in a single step to minimize combining loss.

In operation, an input signal 54 is propagated from the input port 12 to the input coaxial waveguide section 14, where it radiates along the channel 14' between the input inner conductor 18 and the input outer conductor 20 and concurrently provides the input signal 54 to the center waveguide section 16 in a radial manner. The input antenna structures 48 of the plurality of amplifier assemblies 22 collectively form an input antenna array 56. The input antenna array 56 couples the input signal 54 from the input coaxial waveguide section 14, distributing the input signal 54 substantially evenly to each one of the amplifier assemblies 22. Each input antenna structure 48 receives a signal portion of the input signal 54 and communicates the signal portion to the amplifier 52. The amplifier 52 amplifies the signal portion of the input signal 54 to generate an amplified signal portion that is then transmitted from the amplifier 52 to the output antenna structure 50. The output antenna structures 50 collectively form an output antenna array 62 that operates to provide the amplified signal portions to be concurrently combined inside the opening of the output coaxial waveguide section 32 to form an amplified output signal $\mathbf{54}_{AMP}$, which is then propagated along the channel 32' of the output coaxial waveguide section 32 to the output port 34.

Figure 1B:
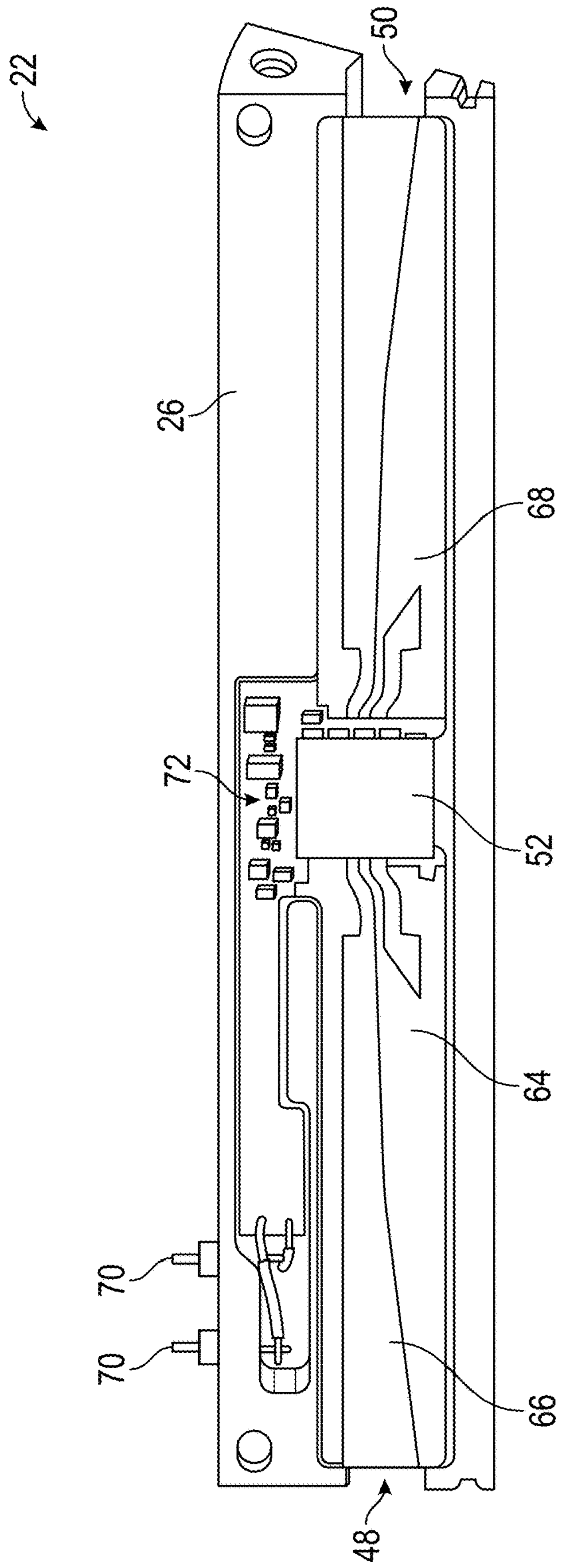
FIG. 1B is a perspective view of an individual amplifier assembly of the spatial power-combining device of FIG. 1A.

FIG. 1B is a perspective view of an individual amplifier assembly 22 of the spatial power-combining device 10 of FIG. 1A. The input antenna structure 48 may comprise an input signal conductor 64 supported on a first face of a substrate 66 or board, and the output antenna structure 50 comprises an output signal conductor 68 that is also supported on the first face of the substrate 66. The input signal conductor 64 and the output signal conductor 68 are electromagnetically coupled to the amplifier 52. The substrate 66 may comprise a printed circuit board that provides a desired form factor and mechanical support for the input signal conductor 64 and the output signal conductor 68. The input antenna structure 48 also includes an input ground conductor (not visible) on an opposing second face of the substrate 66 to the input signal conductor 64. In a similar manner, the output antenna structure 50 includes an output ground conductor (not visible) on the opposing second face of the substrate 66 to the output signal conductor 68. In other embodiments, the substrate 66 may be substituted with a plurality of substrates or boards. In still other embodiments, the input signal conductor 64, the input ground conductor (not visible), the output signal conductor 68, and the output ground conductor (not visible) are mechanically supported by the body structure 26 such that the substrate 66 may not be present. In certain embodiments, one or more ports 70 are provided for an external voltage input, such as from a direct current voltage source, and corresponding bias circuitry 72 is provided to control the amplifier 52. In certain embodiments, the bias circuitry 72 is arranged on the same substrate 66 as the antenna structures 48, 50. In other embodiments, a separate substrate may be provided for the bias circuitry 72.

In operation, a portion of the input signal (54 in FIG. 1A) is received by the input antenna structure 48 where it radiates between the input signal conductor 64 and the input ground conductor (not visible) and propagates to the amplifier 52 for amplification. For embodiments with a substrate 66, the portion of the input signal (54 in FIG. 1A) radiates between the input signal conductor 64 and the input ground conductor (not visible) through the substrate 66. For embodiments without a substrate 66, the portion of the input signal (54 in FIG. 1A) radiates between the input signal conductor 64 and the input ground conductor (not visible) through air. The amplifier 52 outputs a portion of the amplified signal ($\mathbf{54}_{AMP}$ in FIG. 1A) to the output antenna structure 50 where it radiates between the output signal conductor 68 and the output ground conductor (not visible) in a similar manner.

Turning back to FIG. 1A, the spatial power-combining device 10 is typically utilized for high power-combining applications, such as in systems that transmit RF energy. Accordingly, the amplifier 52 in each of the amplifier assemblies 22 is configured for high power amplification and may therefore generate a high amount of heat. If the operating temperature of each amplifier 52 increases too much, the performance and lifetime of each amplifier 52 may suffer. As previously described, the plurality of amplifier assemblies 22 forms the center waveguide section 16. In this regard, thermal management is needed to effectively dissipate heat in and around the center waveguide section 16. Accordingly, the body structure 26 of each amplifier assembly 22 may typically comprise a thermally conductive material, such as copper (Cu), aluminum (Al), or alloys thereof that are configured to dissipate enough heat from the amplifier 52 to maintain a suitably low operating temperature. In certain applications, the body structure 26 may comprise graphite with an electrically conductive film, such as nickel (Ni), Cu, or combinations thereof. In still further embodiments, the body structure 26 may comprise metal-ceramic composites, including copper-diamond and/or aluminum-diamond.

In conventional spatial power-combining devices, the inner conductors of input and output coaxial waveguide sections may be mechanically attached to a separate support element, such as a center post by way of one or more mechanical fasteners arranged between the center post and the inner conductors. Amplifier assemblies may be stacked circumferentially around the center post and may have inner surfaces that conform to the outer shape of the center post. Accordingly, the conventional center post is provided to extend throughout the center waveguide section for mechanical support and assembly in conventional spatial power-combining devices. While providing mechanical support for the radially arranged amplifier assemblies, the presence of the center post may occupy space within a spatial power-combining device that may limit overall dimensions.

According to aspects of the present disclosure, various mechanical support structures are provided that allow removal of such conventional center post arrangements. As previously described, mechanical support in the spatial power-combining device 10 of FIG. 1A comprises mechanically attaching the input outer conductor 20 to the input end 16' and mechanically attaching the output outer conductor 38 to the output end 16". According to aspects of the present disclosure, a separate support element, such as the aforementioned center rod or post, is not required for assembly. Removing the conventional center post structure may have particular benefit for applications that include higher frequency operation with shorter wavelengths of electromagnetic radiation and increased bandwidth. For these applications, it may be preferable for the spatial power-combining device 10 to have smaller dimensions. Accordingly, the spacing of amplifier assemblies 22 relative to each other along the center axis may be reduced. Removing the conventional center post structure may also provide other benefits, regardless of intended operating frequencies, such as reduced costs, reduced and/or improved mechanical connections, easier assembly, and common designs that are scalable across multiple frequency bands.

As will be described in greater detail below, mechanical fastener structures that allow removal of conventional center posts may include mechanical structures, such as separate bolt structures for coupling opposing inner conductors 18 and 36. In certain embodiments, mechanical fastener structures include integrated mechanical structures within the center waveguide section 16, such as portions of bolt structures that reside between amplifier assemblies 22.

Figure 2A:
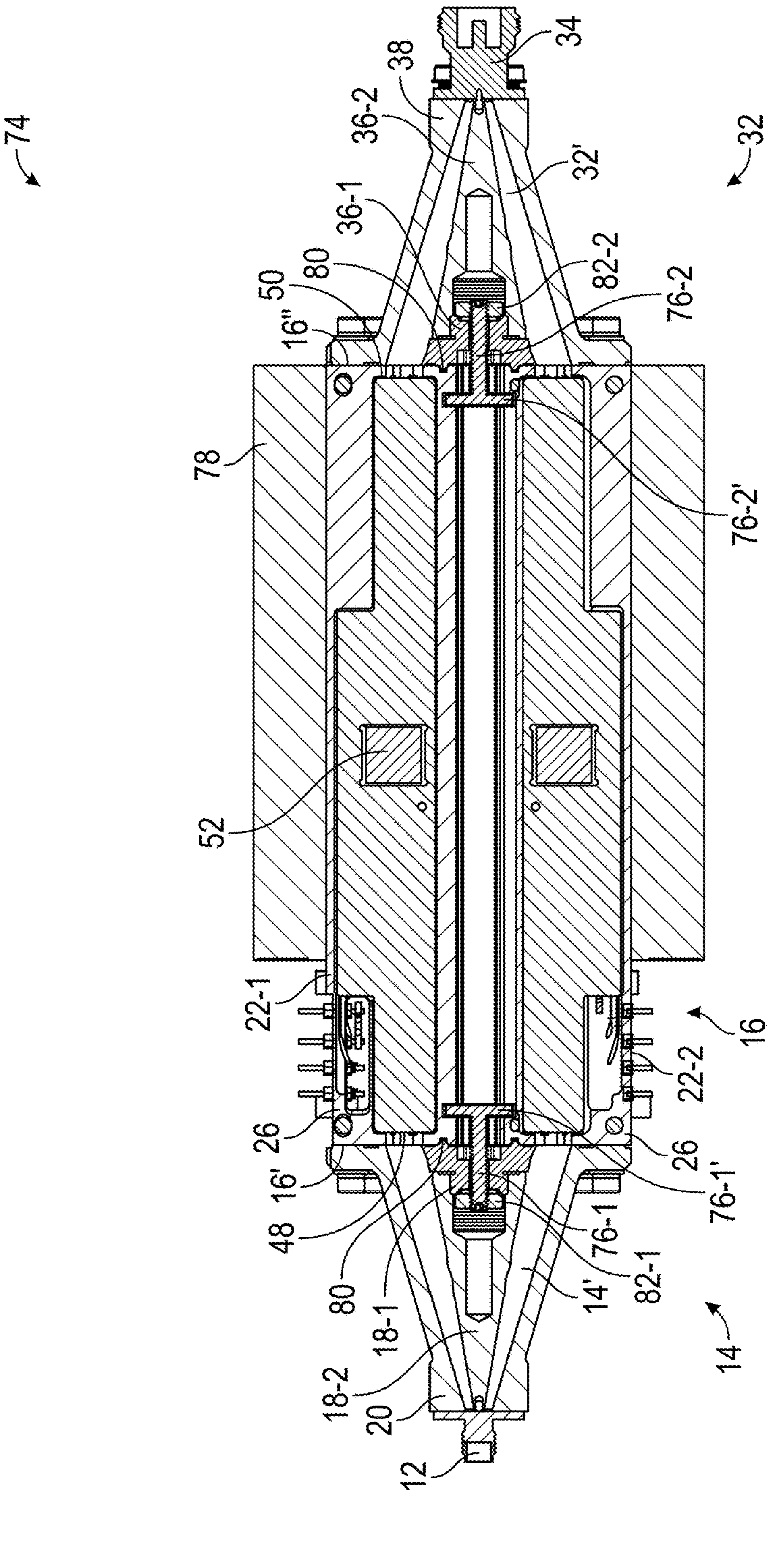
FIG. 2A is a partial cross-sectional view of a spatial power-combining device that is similar to the spatial-power combining device of FIGS. 1A and 1B, and further includes one or more mechanical fasteners according to principles of the present disclosure.

FIG. 2A is a partial cross-sectional view of a spatial power-combining device 74 that is similar to the spatial-power combining device 10 of FIGS. 1A and 1B, and further includes one or more mechanical fasteners 76-1, 76-2 for mechanically connecting the input coaxial waveguide section 14 and the output coaxial waveguide section 32 to the center waveguide section 16. The mechanical fasteners 76-1, 76-2 may embody bolts, screws, and/or threaded rods, among others. In the cross-sectional view, amplifier assemblies 22-1 and 22-2 are visible while other amplifier assemblies are omitted for illustrative purposes. For illustrative purposes, details of the input antenna structure 48 and the output antenna structure 50 are omitted; however, unless otherwise specified, it is understood that the amplifier assemblies 22-1, 22-2 of FIG. 2A include the features of FIG. 1B. Both the input end 16' and the output end 16" of the plurality of amplifier assemblies 22-1, 22-2 are visible within the center waveguide section 16. The input port 12 and input coaxial waveguide section 14 are located adjacent the input end 16', and the output port 34 and the output coaxial waveguide section 32 are located adjacent the output end 16". A thermal structure 78, such as a heat sink may be arranged around at least a portion of the center waveguide section 16. The input coaxial waveguide section 14 comprises first and second input inner conductor portions 18-1, 18-2, referred to collectively as the input inner conductor 18, and the input outer conductor 20, and the output coaxial waveguide section 32 comprises first and second output inner conductor portions 36-1, 36-2, referred to collectively as the output inner conductor 36, and the output outer conductor 38. In conventional devices, a center post may be typically employed that is centrally arranged with respect to the amplifier assemblies 22-1, 22-2 and such a central post is attached to the input and output coaxial waveguide sections 14, 32. By arranging the mechanical fasteners 76-1, 76-2 proximate each end 16' and 16" of the center waveguide section 16, a number of mechanical connections in the spatial power-combining device 74 may be reduced to provide lower costs, easier assembly, and an overall structure that is more readily scalable in size to accommodate different operating frequency bands.

Depending on the embodiment, the first and second portions 18-1, 18-2 of the input inner conductor 18 may form a single unitary element or separate elements or portions that are attached to one another to collectively form the input inner conductor 18. In a similar manner, first and second portions 36-1, 36-2 of the output inner conductor 36 may form a single unitary structure or separate elements or portions that are attached to one another to collectively form the output inner conductor 36. In certain embodiments, one or more of the amplifier assemblies 22-1, 22-2 may form an alignment notch 80 in the body structure 26 that is arranged to receive a corresponding protruding feature of either the first portion 18-1 of the input inner conductor 18 or the first portion 36-1 of the output inner conductor 36.

In certain embodiments, a first nut 82-1 may be positioned within the input coaxial waveguide section 14 for receiving the mechanical fastener 76-1. In this manner, a head 76-1' of the mechanical fastener 76-1 may be positioned within the center waveguide section 16. For embodiments where the first portion 18-1 and the second portion 18-2 are separate elements, the first portion 18-1 is positioned between the first nut 82-1 and the center waveguide section 16. After the first nut 82-1 is secured to the mechanical fastener 76-1, the second portion 18-2 may enclose the first nut 82-1 within the input coaxial waveguide section 14. By positioning the first nut 82-1 outside the center waveguide section 16, radial torque introduced during tightening of the first nut 82-1 to the mechanical fastener 76-1 is also positioned outside the center waveguide section 16. Accordingly, the radial torque at the first nut 82-1 does not apply outward force to the amplifier assemblies 22-1, 22-2 during assembly, thereby avoiding unintended radial separation of the amplifier assemblies 22-1, 22-2. Furthermore, the tightening of the first nut 82-1 as described above applies a longitudinal force that effectively pulls the amplifier assemblies 22-1, 22-2 into the notches 80 for further mechanical locking.

In certain embodiments, a similar arrangement is provided for the output side where a head 76-2' of the mechanical fastener 76-2 is positioned within the center waveguide section 16 and a second nut 82-2 is positioned within the output coaxial waveguide section 32. The first output inner conductor portion 36-1 may be positioned between the second nut 82-2 and the center waveguide section 16. After the second nut 82-2 is secured to the mechanical fastener 76-2, the second output inner conductor portion 36-2 may enclose the second nut 82-2 within the output coaxial waveguide section 32.

Figure 2B:
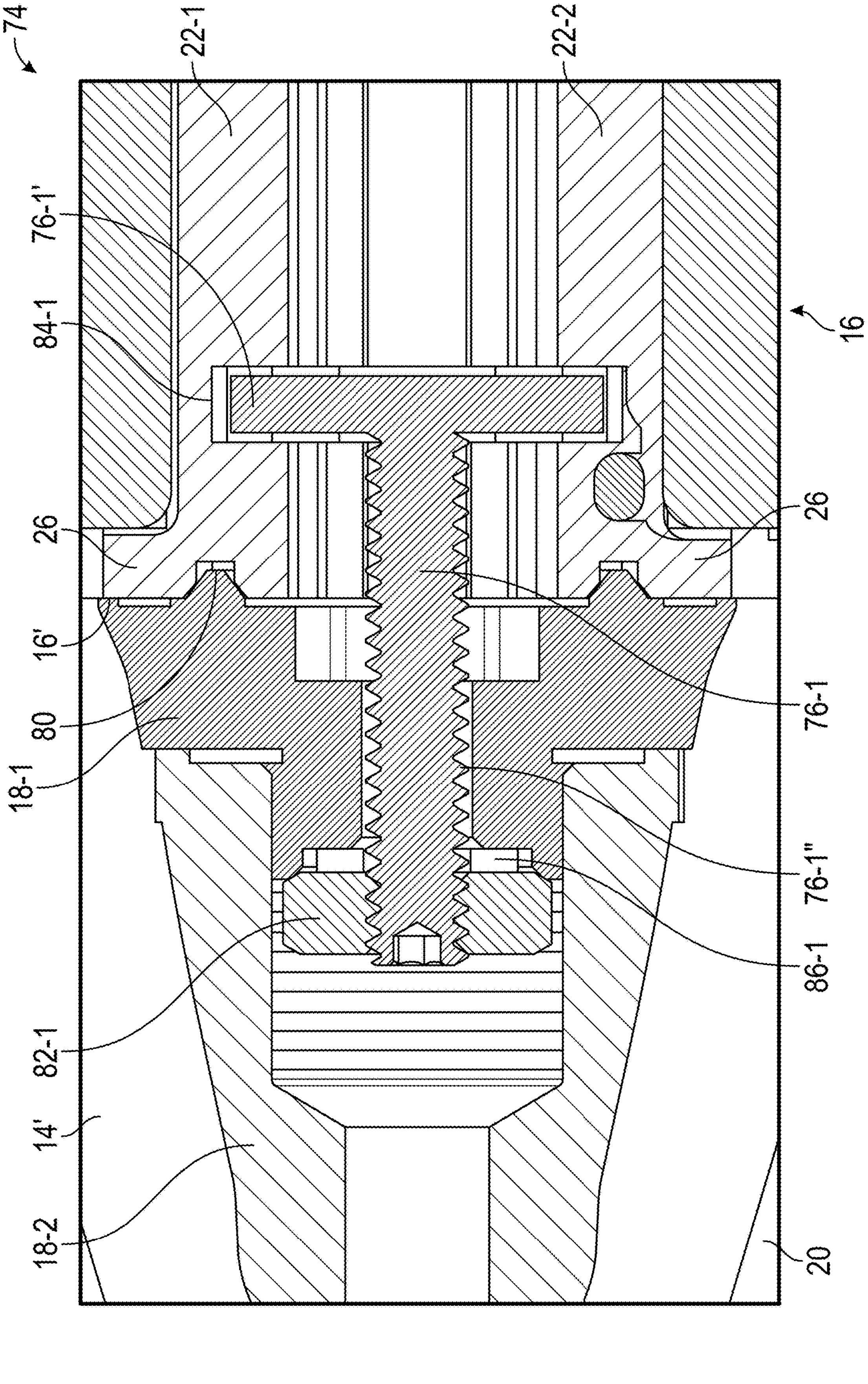
FIG. 2B is an expanded cross-sectional view of a portion of the spatial power-combining device of FIG. 2A illustrating a first mechanical fastener of FIG. 2A.
Figure 2C:
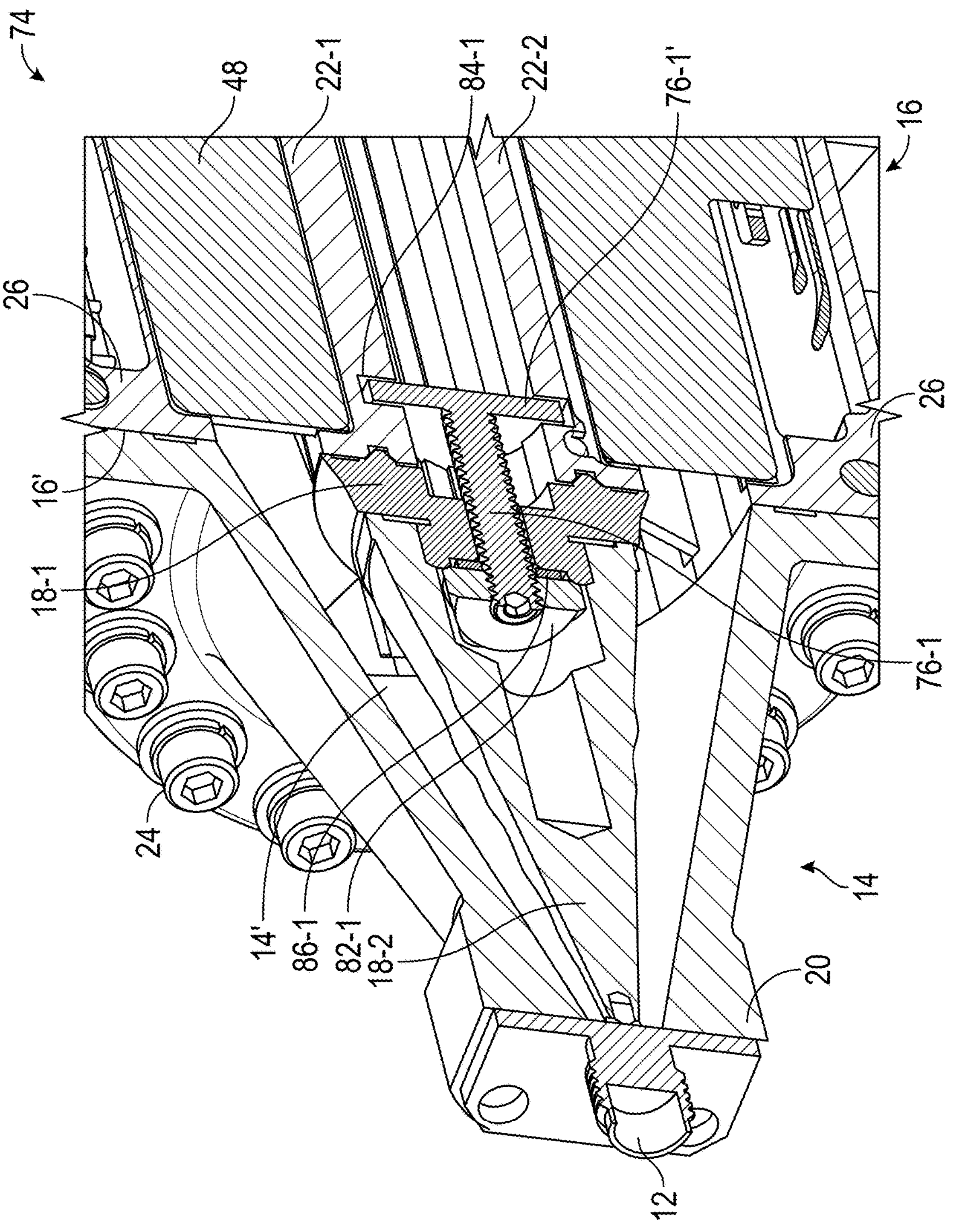
FIG. 2C is an expanded cross-sectional and perspective view of a portion of the spatial power-combining device of FIG. 2A and also illustrating the first mechanical fastener of FIG. 2A.

FIG. 2B is an expanded cross-sectional view of a portion of the spatial power-combining device 74 of FIG. 2A illustrating the first mechanical fastener 76-1. FIG. 2C is an expanded cross-sectional and perspective view of a portion of the spatial power-combining device 74 of FIG. 2A and also illustrating the first mechanical fastener 76-1. As illustrated, a threaded portion 76-1" of the first mechanical fastener 76-1 extends through the input inner conductor portion 18-1 and is secured to the first nut 82-1. The body structure 26 of each amplifier assembly 22-1, 22-2 forms a slot 84-1 shaped to house a portion of the head 76-1'. As illustrated, the slot 84-1 is formed within the body structure 26 in an arrangement that is spaced from the first end 16' of the center waveguide section 16. The slot 84-1 from each of the amplifier assemblies 22-1, 22-2 collectively forms a radial groove or cavity within the center waveguide section 16 that houses the head 76-1' entirely within the center waveguide section 16. Such a radial groove or cavity may form a generally circular shape that is larger than the head 76-1' to further avoid introducing radial force to the amplifier assemblies 22-1, 22-2 during assembly.

As further illustrated, a washer 86-1 may be positioned between the first nut 82-1 and the first portion 18-1 of the input inner conductor 18. In this manner, the first nut 82-1 may be secured to the first mechanical fastener 76-1 with tightening to the washer 86-1. In certain embodiments, the washer 86-1 may be a separate piece. In alternative embodiments, the washer 86-1 may be machined as a single piece together with the first mechanical fastener 76-1. The washer 86-1 may be structured such that the first mechanical fastener 76-1 is tap threaded therethrough to further lock the first mechanical fastener 76-1 in place. In various embodiments, the washer 86-1 may have a generally round shape.

Figure 2D:
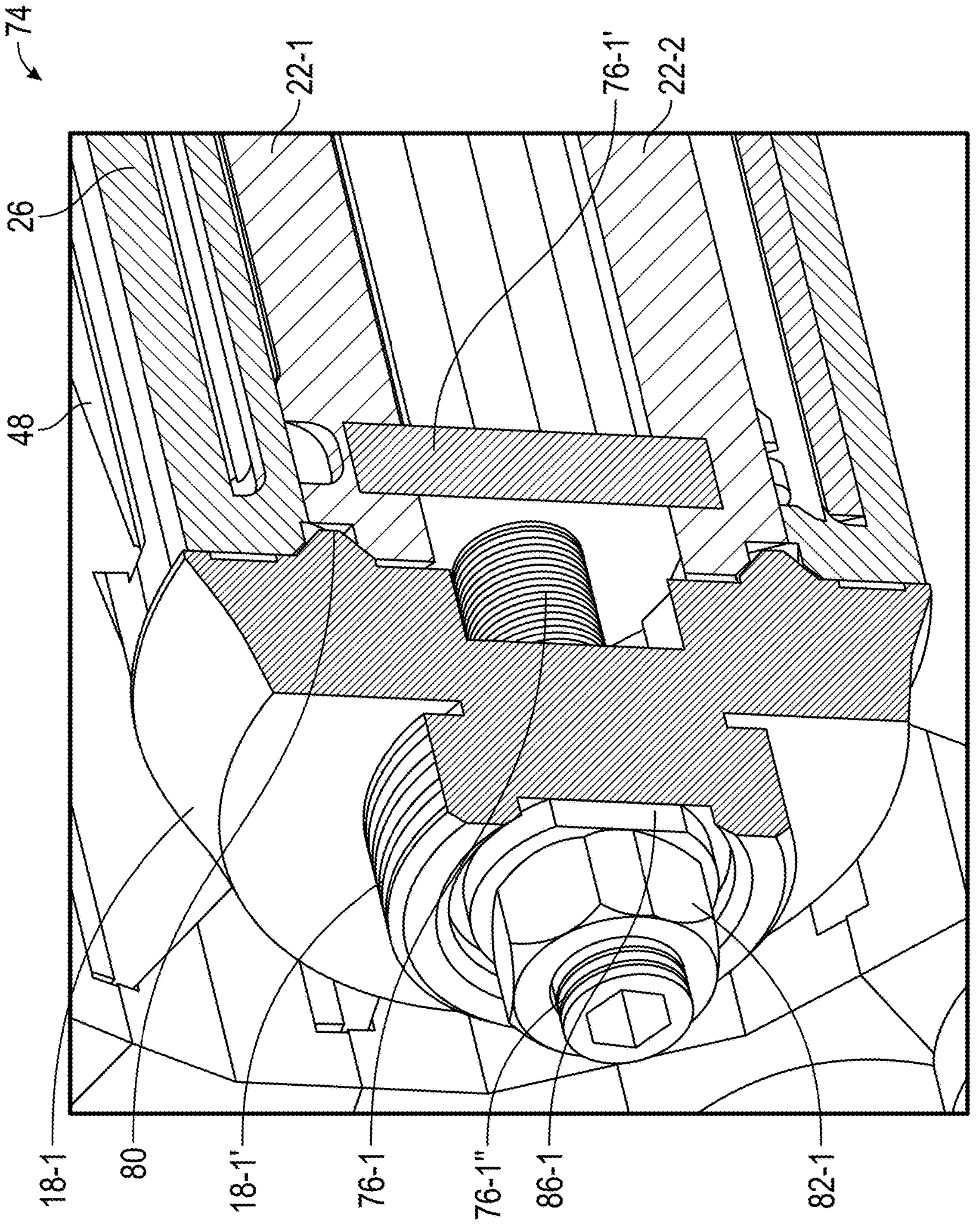
FIG. 2D is an expanded cross-sectional and perspective view of a portion of the spatial power-combining device of FIG. 2C illustrating the first mechanical fastener relative to a first portion of an input inner conductor.

FIG. 2D is an expanded cross-sectional and perspective view of a portion of the spatial power-combining device 74 of FIG. 2C illustrating the first mechanical fastener 76-1 relative to the first portion 18-1 of the input inner conductor 18 of FIG. 2C. FIG. 2D provides a view at an intermediate fabrication step for assembling the spatial power-combining device 74. In this regard, the amplifier assemblies 22-1, 22-2 are radially arranged about a center axis such that each slot 84-1 forms a radial cavity for housing the head 76-1' of the first mechanical fastener 76-1. With the first mechanical fastener 76-1 in place, the first portion 18-1 may be attached to the first end 16' such that the threaded portion 76-1" extends through the first portion 18-1. The first nut 82-1 may then be tightened to the first mechanical fastener 76-1 and/or washer 86-1 such that the first portion 18-1 is between the center waveguide section 16 and the first nut 82-1.

With reference to FIGS. 2A to FIG. 2D, a threaded feature 18-1' of the first portion 18-1 (visible in FIG. 2D) may be formed to receive the second portion 18-2 of the input inner conductor 18. Next, the input outer conductor 20 may be attached to the input end 16' to form the input coaxial waveguide section 14 with the channel 14'. In certain embodiments, the input outer conductor 20 is attached to the body 26 of each amplifier assembly 22-1, 22-2 by way of the bolts 24 as illustrated in FIG. 2C. Accordingly, a method for forming the spatial power-combining device 74 includes radially arranging the amplifier assemblies 22-1, 22-2 to form the center waveguide section 16 having the first end 16' and the second end 16", the amplifier assemblies 22-1, 22-2 forming a radial cavity by way of the slot 84-1 that houses the head 76-1' of the first mechanical fastener 76-1, attaching the first portion 18-1 to the center waveguide section 16 such that the threaded portion 76-1" of the first mechanical fastener 76-1 extends through the first portion 18-1 of the input inner conductor 18, and tightening the first nut 82-1 to the first mechanical fastener 76-1 such that the first portion 18-1 is between the center waveguide section 16 and the first nut 82-1. The method may further include attaching the second portion 18-2 to the first portion 18-1 such that the first nut 82-1 is between the first portion 18-1 and the second portion 18-2. The method may further include attaching the input outer conductor 20 to the input end 16' such that the channel 14' and the input coaxial waveguide 14 are formed.

While FIGS. 2B to 2D are from the perspective of the input end 16' of the spatial power-combining device 74, the same principles are equally applicable to the output end 16" of the spatial power-combining device 74. In this regard, the first portion 36-1 of the output inner conductor 36 of FIG. 2A may be attached to the center waveguide section 16 by way of the second mechanical fastener 76-2 with a same structure and arrangement of elements as described above for the input end 16'.

Figure 3:
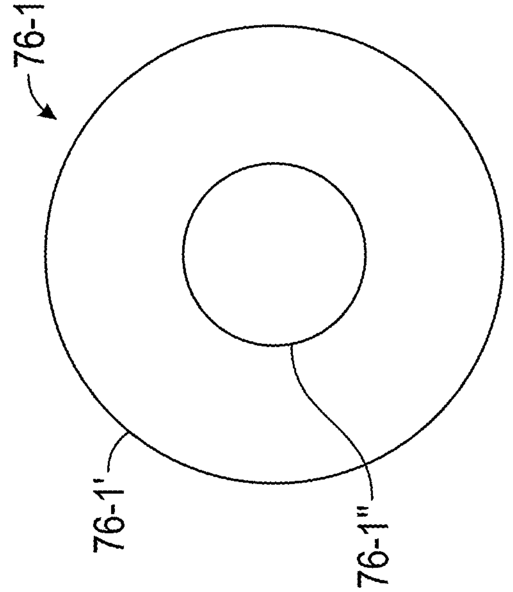
FIG. 3 is an end view of an exemplary shape for the first mechanical fastener of FIGS. 2A to 2D.

FIG. 3 is an end view of an exemplary shape for the first mechanical fastener 76-1 of FIGS. 2A to 2D. The principles described for the first mechanical fastener 76-1 are equally applicable to the second mechanical fastener 76-2 of FIG. 2A. The end view is from the perspective of the threaded portion 76-1" such that the wider shape of the head 76-1' is also visible. As illustrated, the head 76-1' may form a generally round or cylindrical shape and the threaded portion 76-1" may form a smaller round or cylindrical shape. The round shape of the head 76-1 may further reduce radial torque within the radial cavity formed by the slot 84-1 of FIGS. 2B and 2C.

Figure 4:
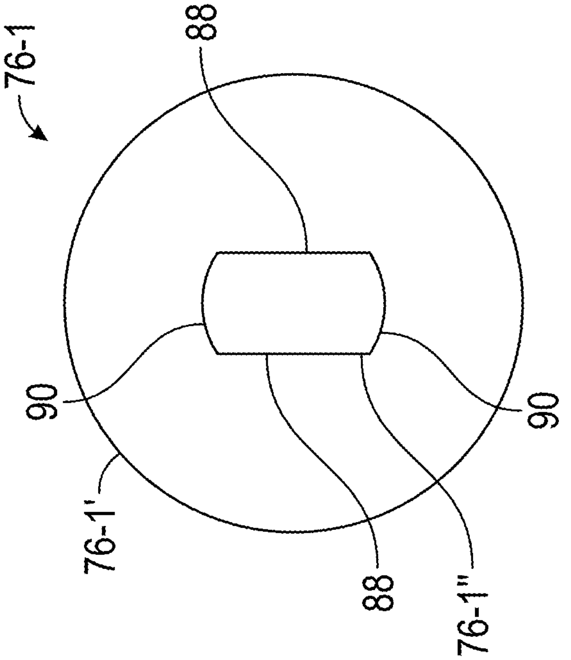
FIG. 4 is an end view of another exemplary shape for the first mechanical fastener of FIGS. 2A to 2D.

FIG. 4 is an end view of another exemplary shape for the first mechanical fastener 76-1 of FIGS. 2A to 2D. As with FIG. 3, the principles described for the first mechanical fastener 76-1 of FIG. 4 are equally applicable to the second mechanical fastener 76-2 of FIG. 2A. In certain embodiments, the threaded portion 76-1" may be formed with opposing flat surfaces 88 that are connected or bound by round surfaces 90. The opposing flat surfaces 88 may be configured to extend through an opening of the first portion 18-1 of the input inner conductor 18 having a corresponding shape. In this regard, the opposing flat surfaces 88 provide a further locking mechanism that is outside the center waveguide section 16.

Figure 5:
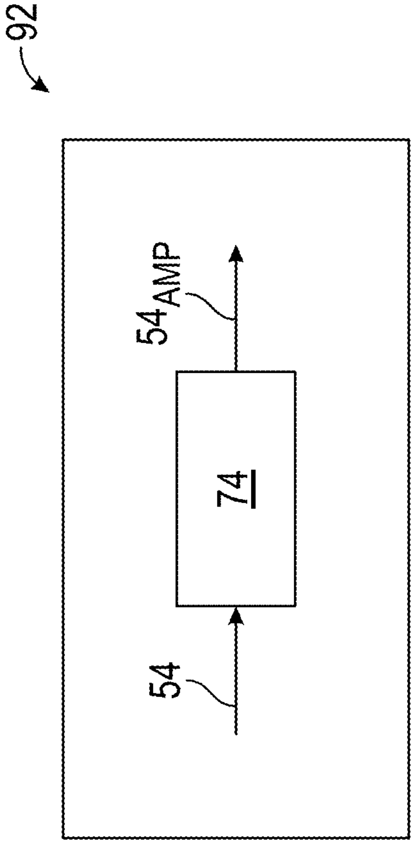
FIG. 5 is a generalized schematic view of a system for transmitting radio frequency energy that includes the spatial power-combining device of FIGS. 2A to 2D.

As described above, aspects of the present disclosure are related to spatial power-combining devices and related systems that transmit RF energy, including but not limited to commercial and defense communication systems, radar systems, electronic warfare systems, satellite communication systems, and various other communication systems. In this regard, FIG. 5 is a generalized schematic view of a system 92 for transmitting radio frequency energy that includes the spatial power-combining device 74 of FIGS. 2A to 2D. Accordingly, the spatial power-combining device 74 may receive the input signal 54 and provide the amplified output signal $\mathbf{54}_{AMP}$ as an integrated element of the larger system 92. Depending on the application, the generalized box for the spatial power-combining device 74 in FIG. 5 may include a plurality of the spatial power-combining devices 74 as described above for FIGS. 2A to 2D. In practice, the system 92 may embody commercial or defense communication systems, radar systems, electronic warfare systems, satellite communication systems, and various other communication systems.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. A spatial power-combining device comprising:
- a center waveguide section comprising a plurality of amplifier assemblies, wherein the plurality of amplifier assemblies forms a first end and a second end;
- a first coaxial waveguide section attached to the first end; and
- a first mechanical fastener at least partially arranged within the center waveguide section such that the plurality of amplifier assemblies is arranged radially around the first mechanical fastener, wherein a head of the first mechanical fastener is positioned within the center waveguide section.

2. The spatial power-combining device of claim 1, wherein the first coaxial waveguide section comprises a first outer conductor and a first inner conductor that form a first channel therebetween, and a threaded portion of the first mechanical fastener extends through a portion of the first inner conductor.

3. The spatial power-combining device of claim 2, further comprising a first nut in the first coaxial waveguide section, wherein the threaded portion of the first mechanical fastener is secured to the first nut.

4. The spatial power-combining device of claim 3, wherein:
- the first inner conductor comprises a first portion and a second portion that is attached to the first portion; and
- the first nut is positioned between the first portion of the first inner conductor and the second portion of the first inner conductor.

5. The spatial power-combining device of claim 4, further comprising a washer between the first nut and the first portion of the first inner conductor.

6. The spatial power-combining device of claim 2, wherein the head of the first mechanical fastener forms a round shape, and the threaded portion of the first mechanical fastener forms another round shape.

7. The spatial power-combining device of claim 2, wherein the threaded portion of the first mechanical fastener forms a shape with opposing flat surfaces.

8. The spatial power-combining device of claim 1, wherein:
- each amplifier assembly of the plurality of amplifier assemblies forms a first slot within the center waveguide section;
- the first slot of each amplifier assembly of the plurality of amplifier assemblies forms a radial cavity; and
- the head of the first mechanical fastener is positioned within the radial cavity.

9. The spatial power-combining device of claim 1, further comprising:
- a second coaxial waveguide section attached to the second end; and
- a second mechanical fastener at least partially arranged within the center waveguide section such that the plurality of amplifier assemblies is arranged radially around the second mechanical fastener, wherein a head of the second mechanical fastener is positioned within the center waveguide section.

10. The spatial power-combining device of claim 9, wherein the second coaxial waveguide section comprises a second outer conductor and a second inner conductor that form a second channel therebetween, and a threaded portion of the second mechanical fastener extends through a portion of the second inner conductor.

11. The spatial power-combining device of claim 10, further comprising a second nut in the second coaxial waveguide section, wherein the threaded portion of the second mechanical fastener is secured to the second nut.

12. The spatial power-combining device of claim 11, wherein:
- the second inner conductor comprises a first portion that is attached to a second portion; and
- the second nut is positioned between the first portion of the second inner conductor and the second portion of the second inner conductor.

13. A method of forming a spatial power-combining device, the method comprising:
- radially arranging a plurality of amplifier assemblies to form a center waveguide section having a first end and a second end, the plurality of amplifier assemblies forming a radial cavity that houses a head of a first mechanical fastener;

attaching a first portion of a first inner conductor to the center waveguide section such that a threaded portion of the first mechanical fastener extends through the first portion of the first inner conductor; and tightening a first nut to the first mechanical fastener such that the first portion of the first inner conductor is between the center waveguide section and the first nut.

14. The method of claim 13, further comprising attaching a second portion of the first inner conductor to the first portion of the first inner conductor, such that the first nut is between the first portion of the first inner conductor and the second portion of the first inner conductor.

15. The method of claim 14, further comprising attaching a first outer conductor to the first end such that a first channel is formed between the first inner conductor and the first outer conductor, wherein the first inner conductor and the first outer conductor form a first coaxial waveguide that is attached to the center waveguide section.

16. The method of claim 15, wherein the first outer conductor is attached to each amplifier assembly of the plurality of amplifier assemblies by a plurality of additional mechanical fasteners.

17. A system for transmitting radio frequency energy, the system comprising:

one or more spatial power-combining devices, wherein at least one of the one or more spatial power-combining devices comprises:

a center waveguide section comprising a plurality of amplifier assemblies, wherein the plurality of amplifier assemblies forms a first end and a second end;

a first coaxial waveguide section attached to the first end; and a first mechanical fastener at least partially arranged within the center waveguide section such that the plurality of amplifier assemblies is arranged radially around the first mechanical fastener, wherein a head of the first mechanical fastener is positioned within the center waveguide section.

18. The system of claim 17, wherein the first coaxial waveguide section comprises a first outer conductor and a first inner conductor that form a first channel therebetween, and a threaded portion of the first mechanical fastener extends through a portion of the first inner conductor.

19. The system of claim 18, further comprising a first nut in the first coaxial waveguide section, wherein the threaded portion of the first mechanical fastener is secured to the first nut, wherein the first inner conductor comprises a first portion and a second portion that is attached to the first portion, and the first nut is positioned between the first portion of the first inner conductor and the second portion of the first inner conductor.

20. The system of claim 17, wherein the system comprises a satellite communications system.

* * * * *